United States Patent
Barajas Gonzalez et al.

(10) Patent No.: US 10,171,505 B2
(45) Date of Patent: Jan. 1, 2019

(54) PREVENTATIVE ENTERPRISE CHANGE MANAGEMENT

(71) Applicant: INTERNATIONAL BUSINESS MACHINES CORPORATION, Armonk, NY (US)

(72) Inventors: Emmanuel Barajas Gonzalez, Guadalajara (MX); Shawn M. Bramblett, Vail, AZ (US); Alan Dash, Vail, AZ (US); Shaun E. Harrington, Sahuarita, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 14/967,544

(22) Filed: Dec. 14, 2015

(65) Prior Publication Data

US 2017/0171203 A1   Jun. 15, 2017

(51) Int. Cl.
*H04L 29/06*   (2006.01)
*G06F 21/32*   (2013.01)

(52) U.S. Cl.
CPC ............. *H04L 63/20* (2013.01); *G06F 21/32* (2013.01)

(58) Field of Classification Search
CPC ............................ H04L 63/10; H04L 63/0861
See application file for complete search history.

(56) References Cited

U.S. PATENT DOCUMENTS

| | | | | |
|---|---|---|---|---|
| 9,662,015 | B2 * | 5/2017 | Proud ................. | A61B 5/0024 |
| 2006/0075506 | A1 * | 4/2006 | Sanda ................. | G06F 21/316 726/26 |
| 2006/0265489 | A1 * | 11/2006 | Moore .................. | H04L 69/40 709/223 |
| 2007/0004381 | A1 * | 1/2007 | Larson .................. | G06F 21/35 455/411 |
| 2014/0244344 | A1 * | 8/2014 | Bilet ................. | G06Q 10/0635 705/7.28 |
| 2014/0354529 | A1 * | 12/2014 | Laughlin ................. | G06F 3/011 345/156 |
| 2016/0151052 | A1 * | 6/2016 | Balwani ................ | A61B 10/02 600/562 |
| 2016/0300461 | A1 * | 10/2016 | Cocuzza ............... | G05D 23/22 |

FOREIGN PATENT DOCUMENTS

JP        5168348 B2      3/2013
WO    2015035202 A1      3/2015

OTHER PUBLICATIONS

Anonymous, "Using Augmented Reality to Enhance Diagnostics, Repair and Assembly," IP.com, IPCOM000223150D, Nov. 5, 2012 (3 pages).

* cited by examiner

*Primary Examiner* — Mahfuzur Rahman
*Assistant Examiner* — Narciso F Victoria
(74) *Attorney, Agent, or Firm* — Griffiths & Seaton PLLC

(57) ABSTRACT

Embodiments for implementing change control management in computing center environments by a processor. A physical activity of a user performing an action in the computing center environment is monitored. If the monitored activity is determined to be contrary, or predicted to be contrary, to a preferred, predetermined action for the computing center environment, the user is alerted that the action is contrary, and an operation is performed on the computing center environment to secure data in the computing center environment from damage potentially caused by the contrary action.

21 Claims, 4 Drawing Sheets

PREVENTATIVE ENTERPRISE CHANGE MANAGEMENT

BACKGROUND OF THE INVENTION

Field of the Invention

The present invention relates in general computing systems, and more particularly to, various embodiments for change management in computing environments.

Description of the Related Art

Today with modern technology, large volumes of data are storable on disk drives, along with processing resources in rack mount component form factor in large computing center environments. These computer center environments may, for example, house hundreds of individual server components. Some servers may be dedicated to storage of data, while other servers may handle processing tasks. Still others may contain networking, security, or other resources.

SUMMARY OF THE INVENTION

Various embodiments for implementing change control management in computing center environments by a processor are provided. In one embodiment, by way of example only, a method for implementing change control management in computing center environments by a processor is provided. A physical activity of a user performing an action in the computing center environment is monitored. If the monitored activity is one of determined to be contrary and predicted to be contrary to a preferred, predetermined action for the computing center environment, the user is alerted that the action is contrary, and an operation is performed on the computing center environment to secure data in the computing center environment from damage potentially caused by the contrary action.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
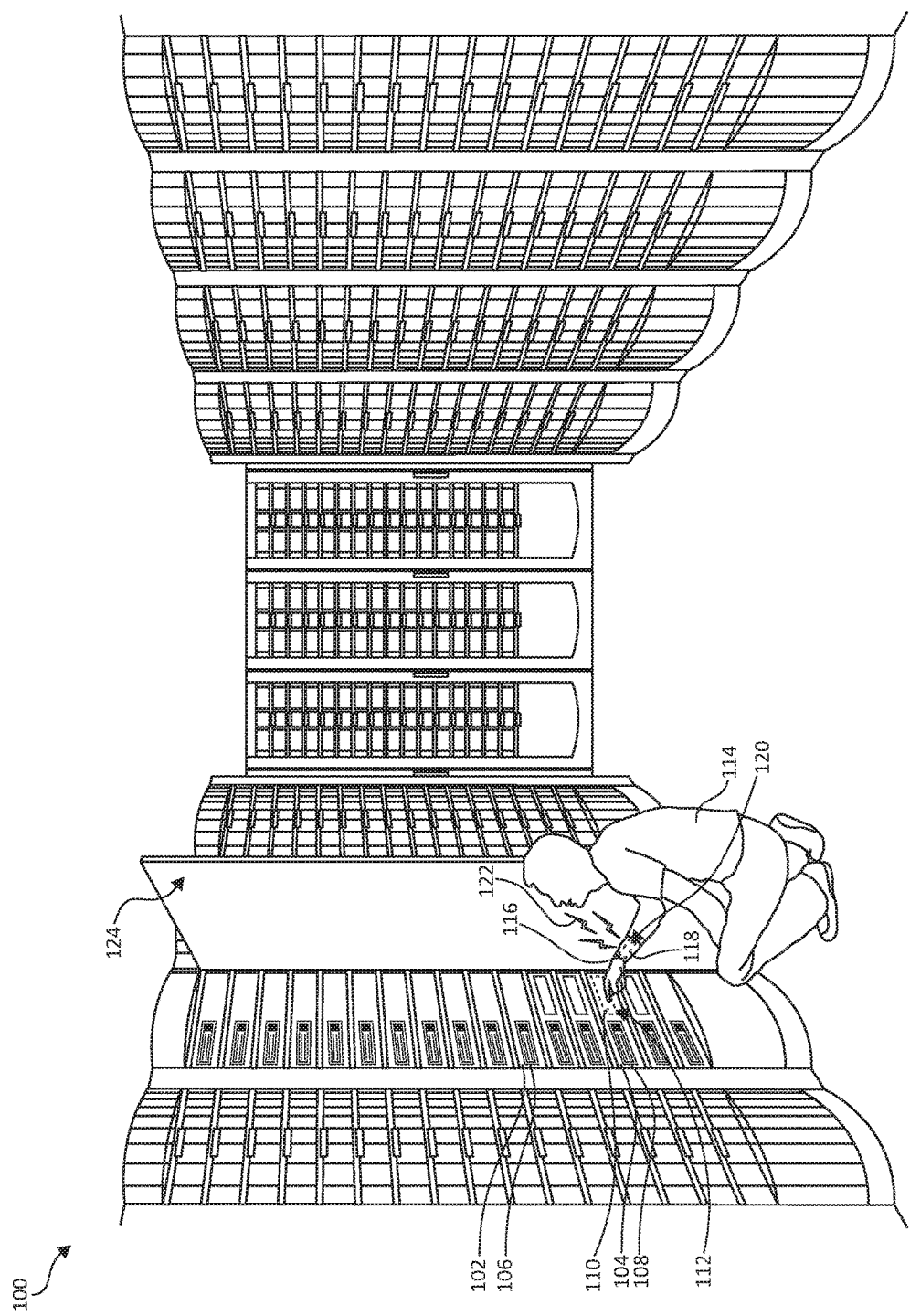
FIG. 1 is an illustration of a computing center environment, in which various aspects of the present invention may be realized.

In today's large computing environments, such as data centers with hundreds or even thousands of components enclosed within individual racks, users charged with maintenance and repair of such environments face an increasingly complex and interconnected system, where if a small problem is not corrected in a precise manner, a more serious and widespread problem may result.

Consider the following example. In a particular computing environment, a set of two batteries may provide power to a particular computing component. If, in the case that one of the batteries fails, it may be the responsibility of a user to replace the failed battery. If, however, the user were to go onsite to replace the failed battery, and remove the wrong battery (i.e., the battery that is now powering the component), power to the component is removed, and what was originally a maintenance issue for the facility may instantly become a more serious problem as data in the system may be lost or corrupted due to the loss of electrical power to the component. In another example, the user may mistakenly remove the wrong storage device in a storage array having a failed drive (i.e., the user removed a working drive and failed to remove the failed drive).

Human error when interacting in these complicated environments is inevitable, and invariably results in challenges for the computing environments, not the least of which being downtime as part of the system shuts down, or even more serious, a loss or corruption of valuable data.

While human error can be minimized with extensive training, for example, training alone may not eliminate the chance that a user error may create system downtimes or more serious system problems. A need exists for mechanisms to take preventative approaches to further reduce the chances for user error in computing and other electronic environments.

Accordingly, the mechanisms of the illustrated embodiments provide functionality for further minimization of user error associated with computing environments, such as large, complicated data storage environments. As will be further illustrated and described, the mechanisms of the illustrated embodiments provide functionality for predicting hardware change mistakes and preventative solutions to either alert the user of the mistake, and if necessary, secure data in the computing environment before an outage or another system problem occurs. These actions may include haptic feedback, audible warnings, and performing computing operations that, for example, put at least a portion of the computing environment into a recoverable downstate before the outage occurs.

The mechanisms of the present invention, among other aspects, implement functionality for monitoring the user's physical activity in the computing environment in combination with wearable technology, and use predictive analytics to determine if the user is about to "do the wrong thing" in a physical action on the computing environment. If the mechanisms of the illustrated embodiments determine that the user is, or is about to perform an action contrary to an established course of action, the mechanisms of the illustrated embodiments employ haptic feedback through the wearable technology to the user, who is then alerted from making the mistake on the computing component. In addition, if the mechanisms predict that, based on the monitored activity of the user, that the user will make the mistake, the mechanisms may employ preventative operations on the computing environment in advance of the mistake.

In view of the foregoing, when certain scenarios present themselves that the mechanisms of the illustrated embodiments determine is contrary to an accepted course of action for a particular component, the mechanisms may employ the previously indicated haptic feedback, such as vibrating a wristband that the user is wearing, to alert the user of the contrary course of action the user is taking. In addition, the mechanisms of the illustrated embodiments can also leverage existing auditory and visual indicators that may already exist in the computing environment such as activating a warning light, indicating an alert on a computer monitor, or sounding an alarm through a speaker.

If, in one embodiment, the user does not correct the contrary course of action, the mechanisms of the illustrated embodiments, at any time during the interaction of the user with the equipment in the computing environment, initiate operations to secure the equipment and associated data stored on the equipment. While the initiation of these operations may prevent any further use of the component until the situation is handled appropriately, the operations also serve to remove any possibility of jobs currently being processed by the computing components being lost.

In one embodiment, use of wearable technology pursuant to the various aspects of the present invention also allows the tracking of certain movements of the user when interacting with the computing equipment, such as specific gestures and/or motions that result in changes to the computing environment (e.g., gestures resulting in, for example, how a hard drive lock is removed and a particular drive is pulled out of a bay, or how a battery compartment is opened, and so forth).

Based on the state of a particular computing environment, the mechanisms of the illustrated embodiments, then, monitor what the user is physically doing within the environment, and alert the user (and others, potentially) if a certain assumed action plan could result, for example, in data corruption. In addition, the mechanisms of the illustrated embodiments enable the implementation of certain predetermined action plans and tracked in real time as they are executed by the user in the environment.

Turning now to the Figures, FIG. 1 illustrates a computing center environment 100, such as a server room 100, data center 100, or other similar environment featuring a number of rack-mounted server components that are interconnected to form a complex system. In the depicted embodiment, the computing center environment 100 includes a number of individual racks housing individual servers, such as server 102 and 104. A number of sensor devices, such as sensors 106, 108, and 110 are located about and within the servers 102 and 104 as shown in the rack mount systems. While sensors 106, 108, and 110 are shown, arrow 112 contemplates that the illustration depicted is merely representative of the locations, sizes, etc., of server components and sensor devices 106, 108, and 110 that may be installed in the environment 100.

In one embodiment, the computing environment 100 is a datacenter environment 100. The datacenter environment 100 may include a number of servers (e.g., Lenovo® System x3650, HP® ProLiant DL Rack Mount Servers) including a plurality of physical server devices. A physical server device (e.g., Lenovo® System x3850 M2, HP® Alpha systems) is a computing device including, without limitation, at least one processor, at least one memory device, etc. The computing device may run at least one server application, e.g., Apache HTTP server.

In one embodiment, and as previously described, the illustrated embodiments implement so-called "wearable technology in combination with the sensors 106, 108, 110, 112, and other computing components as will be further described. As presently illustrated, a user technician 114 is engaged in performing a service activity in the computing center environment 100 as shown, by opening a door 124, exposing the various rack mount components to perform work on servers 102 and/or 104 as shown.

User 114 wears a wristband device 116 that serves to implement a variety of aspects of the illustrated embodiments. Wristband device 116 incorporates various sensory, computational, motion, and other characteristics (denoted by box 118) as would be understood by one of ordinary skill in the art. For example, wristband device 116 may communicate wirelessly over signal 122 with various components in the computing center environment, such as sensors 106, 108, 110, and 112 over any known wireless communications protocol. Further, as one of ordinary skill in the art will appreciate, wristband device may incorporate various haptic feedback mechanisms, such as vibration or another mechanism of imparting motion, as well as incorporate various sensor devices such as accelerometers, computing devices such as a central processing unit (CPU) and/or memory devices. Each of these functional characteristics is represented generically in total by box 118 and arrow 120, which generically indicates that such functional components are anticipated to be incorporated into such a device 116.

In one embodiment, for example, the wristband device 116 implements radio frequency identification (RFID) functionality to identify various components in the computing center environment, such as portions of the servers 102 and 104, or other components. In another embodiment, the sensors 106, 108, 110, and 112 communicate with the functional components 118 of the wristband device 116 to identify motions of the hands of the user technician 114, such as predetermined gestures. For example, based on previously stored information, the sensors 106, 108, 110, and 112 may sense certain motions of the hands of the user 114, in combination with a determination of the proximity of the user to a certain component, and determine that the user 114 is preparing to pull a particular disk drive out of an enclosure in the server 102.

As one of ordinary skill in the art, the various sensors (e.g., sensors 106, 108, 110, and 112) shown herein are representative of other sensors that may be employed in the environment 100. These sensors may also include such devices as radio frequency identification (RFID) devices, closed-circuit television (CCTV), bar code scanners/readers, auditory detectors (e.g., microphones), global positioning system (GPS) devices, and other similar devices.

Figure 2:
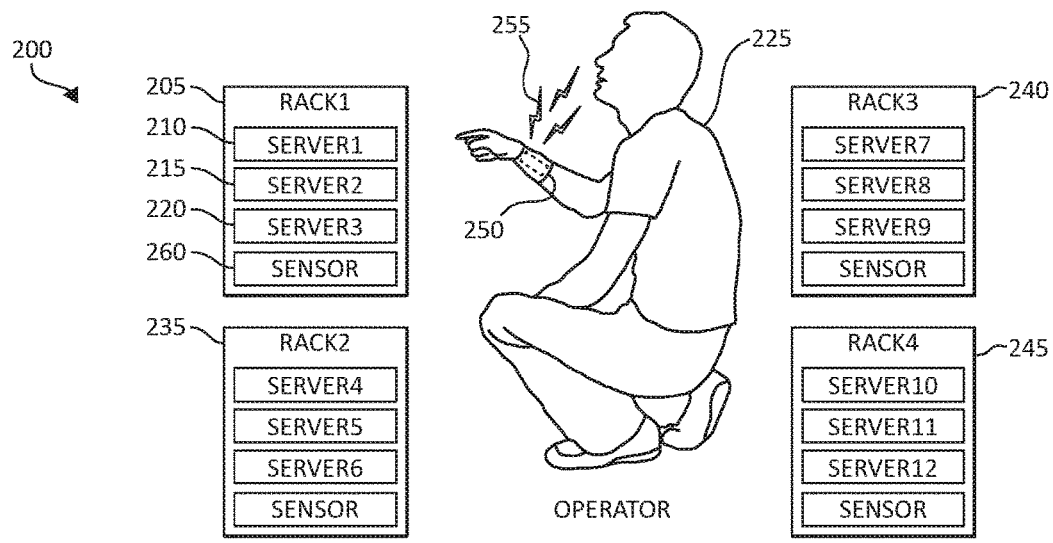
FIG. 2 is a block diagram of an exemplary representation of a computing server environment including servers on racks, one of a number of sensor components and an operator, here again in which aspects of the present invention may be realized.

FIG. 2, following, further illustrates the communicative aspect of the various computing components in an exemplary computing center environment having a number of racks and server components, although one of ordinary skill in the art will appreciate that the functionality imparted by the various aspects of the present invention are applicable to a wide variety of computing environments, or any environment where a user is performing an activity on a component where it is desired for the user to perform the activity correctly.

FIG. 2 illustrates server devices in an exemplary datacenter 200, according to one embodiment of the present invention. In the datacenter 200, there exists a plurality of racks with servers, e.g., a rack 1 (205), a rack 2 (235), a rack 3 (240), a rack 4 (245). A rack includes a plurality of physical server devices. For example, the rack 1 (205) includes a plurality of server devices, e.g., a physical server device 1 (210), a physical server device 2 (215), a physical server device 3 (220), etc. The datacenter 200 includes the sensors 260, which may be mounted in and around the various server components as shown. There may exist an operator 225, technician 225, or other personnel that enter the environment 200 to effect changes on the various servers 210, 215, 220, etc. components in the environment 200. One aspect of the present invention aims to determine an identity of the operator 225 responsible for affecting the change(s) in the environment 200 by recognizing a virtual login associated with the wristband or other wearable technology that the user 225 employs.

Figure 3:
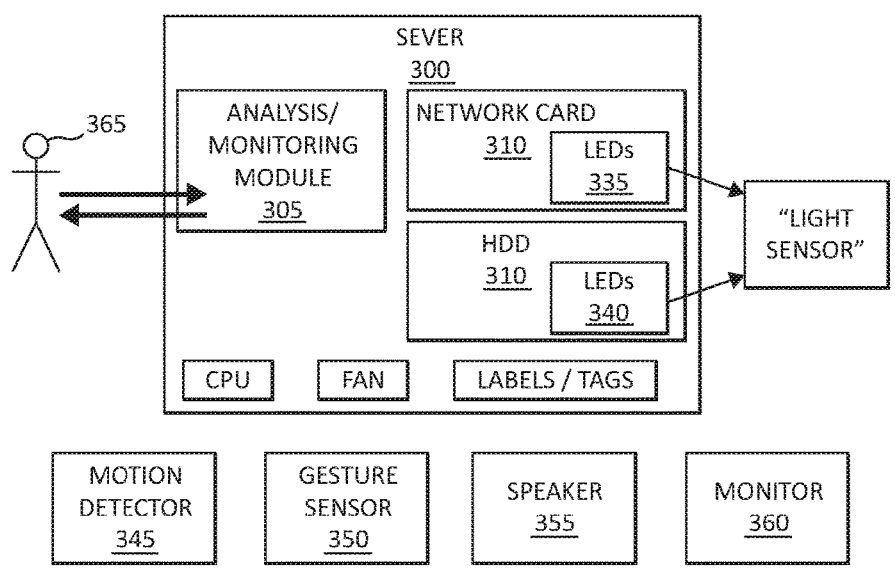
FIG. 3 is a block diagram of one of the servers of FIG. 2, previously, including a number of available monitoring sensor devices, again in which various aspects of the present invention may be implemented.

FIG. 3, following, illustrates components and/or properties in a physical server device 300 according to one embodiment of the present invention. The physical server device 300 exhibits at least one status (manifest as a physical property or otherwise). For example, a network card 310 may incorporate light emitting diodes (LEDs) 335 (as may hard disk drive (HDD) 320 incorporate LEDs 340. The LEDs 335, 340 may blink in accordance with the status of the server, card, or storage device, for example. The LEDs 335, 340 may blink a certain way to reflect the status therein. The light sensor 370 may recognize this blinking pattern to determine a particular status and/or whether the particular status has changed.

As shown, server 300 includes such associated devices as a central processing unit, or CPU, fan for cooling purposes, and labels/tags. The labels/tags associated with the server may include a RFID tag, containing information therein about, for example, a version of current hardware, firmware, or software associated with the server 300.

As previously described, a number of sensor devices, inclusive of light sensor 370, may be utilized to monitor the server 300 and record information about the current status of the monitored server 300 and whether the status has changed, and whether a particular operator 365 was responsible for the change. As depicted in the present figure, sensor devices include motion detector 345 and gesture sensor 350. In addition, a speaker 355 may provide audible alerts to the user 365, and a monitor 360 may visually indicate such alerts to the user 365. Additional sensor, computing, and communications (e.g., WiFi and/or Bluetooth® communications modules) components are contemplated such to enable bidirectional communication and various computational and other functionality in furtherance of the various aspects of the illustrated embodiments.

Each of the sensor devices 345 and 350 may be connected to the analysis/monitoring module 305. The monitoring module 305 may implement monitoring functionality, as well as provide trend analysis of status changes over time as will be further described.

For example, the monitoring module 305 may monitor data through the various server 300 components, such as monitoring current data input and data output throughput, as web as any input/output operations per second (TOPS) being currently computed internally in the server 300. In addition, in one embodiment, the monitoring module 305 may monitor current data held in short term memory locations such as cache memory, or random access memory (RAM), such that data held in these potentially volatile locations may be moved to nonvolatile memory (such as disk) in a data dump, for example, if the mechanisms of the illustrated embodiments were to determine that due to the actions of the user 365, that an immediate data securing operation (such as a partial or complete shutdown) were required.

In one embodiment, the mechanisms of the present invention implement what is referred to herein and in the claims, following, as "Achilles heel" functionality. This is to say that the mechanisms of the illustrated embodiments may identify weak points (i.e., Achilles heel components and/or scenarios) in a particular system. These Achilles heel components/scenarios may be cataloged. For example, various Achilles heel components/scenarios may include whether there are sufficient disk drive modules (DDMs) in a particular redundant array of independent disks (RAID), or battery pairs identified in the event that one battery fails in the pair, such that the mechanisms of the illustrated embodiments then identify the other as the surviving battery for monitoring until the failed battery in the pair is replaced. Other Achilles heel components may incorporate such devices as device adaptors in a network or system, or robots within a particular tape library, for example.

Upon identification of the weak points within the system, the mechanisms of the present invention, in one embodiment, may then monitor these weak points for potential user interaction, so as to verify that the user 365 does not perform incorrect actions on the so-called "last leg" of those components.

If, for example, the user 365 is determined to begin to take part in an action that the mechanisms of the present invention have predetermined to be contrary to the preferred course of action, such as unlocking an incorrect drive from an array that needs to be maintained, the haptic feedback (e.g., vibration) on the wearable technology (e.g., wristband 116, FIG. 1) will warn the user of the incorrect path. In addition, an auditory alarm may sound through the speaker 355, and/or an alert will be shown on the monitor 360.

Wristband 116 in FIG. 1 may incorporate the previously mentioned virtual login functionality, which serves to identify the personnel operating in a particular computing center environment. For example, the various hardware package integrated into the wristband 116 (again, represented generically by 118) may implement biometric technology, such that the user may use the wristband 116 or other wearable device to biometrically verify their identity before being allowed access to a particular computing component. In addition, in the event of a system failure, use of the wristband 116 allows supervisory personnel to identify which user 114 was accessing the computing center environment 100 when the failure occurred, as well as what gestures the user 114 may have been performing on the environment 100 when the failure occurred.

Figure 4:
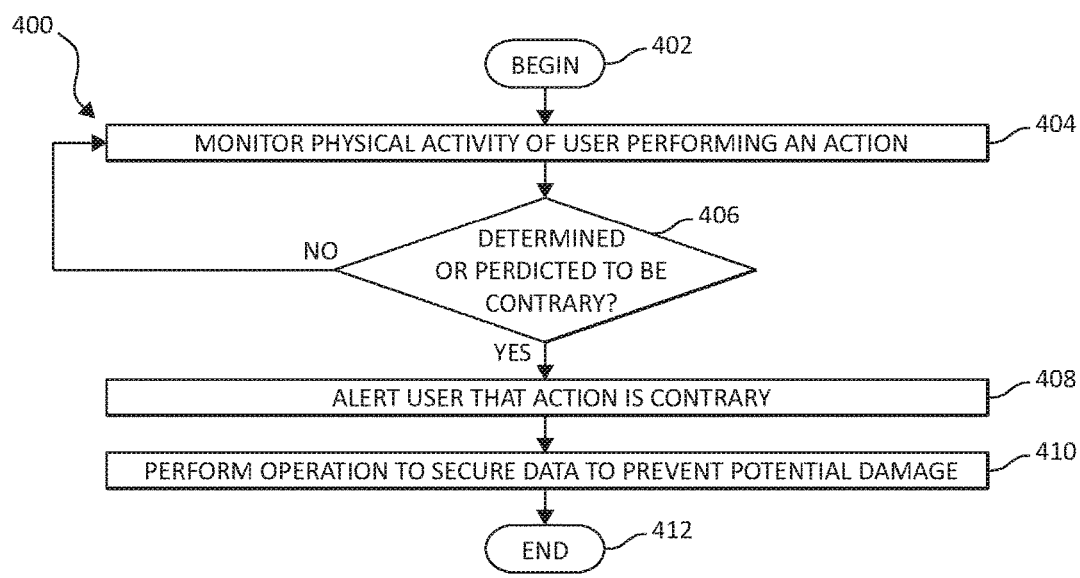
FIG. 4 is a flow chart diagram of an exemplary method for change management for monitored components in computing center environments, in which various aspects of the present invention may be implemented.

FIG. 4, following, illustrates an exemplary method 400 for implementing change management in a computing center environment by a processor, in which various aspects of the present invention may be implemented. Method 400 begins (step 402) with the monitoring of physical activity of a user in the computing center environment performing an action (step 404).

The method 400 then moves to decision step 406, which queries if the physical activity is determined, or predicted to be, contrary to a predetermined course of action for a particular component. If the physical activity is not contrary, the method 400 returns to step 404 to continue monitoring the action. If the action is predicted to be, or is currently, contrary, the method 400 moves to step 408, which alerts the user that the action is contrary (for example, vibrating a wristband on the user's person). The method 400 then moves to step 410, which initiates performing an operation in the computing center environment to secure data in to prevent any potential damage caused by the user's action. The method 400 then ends (step 412).

Figure 5:
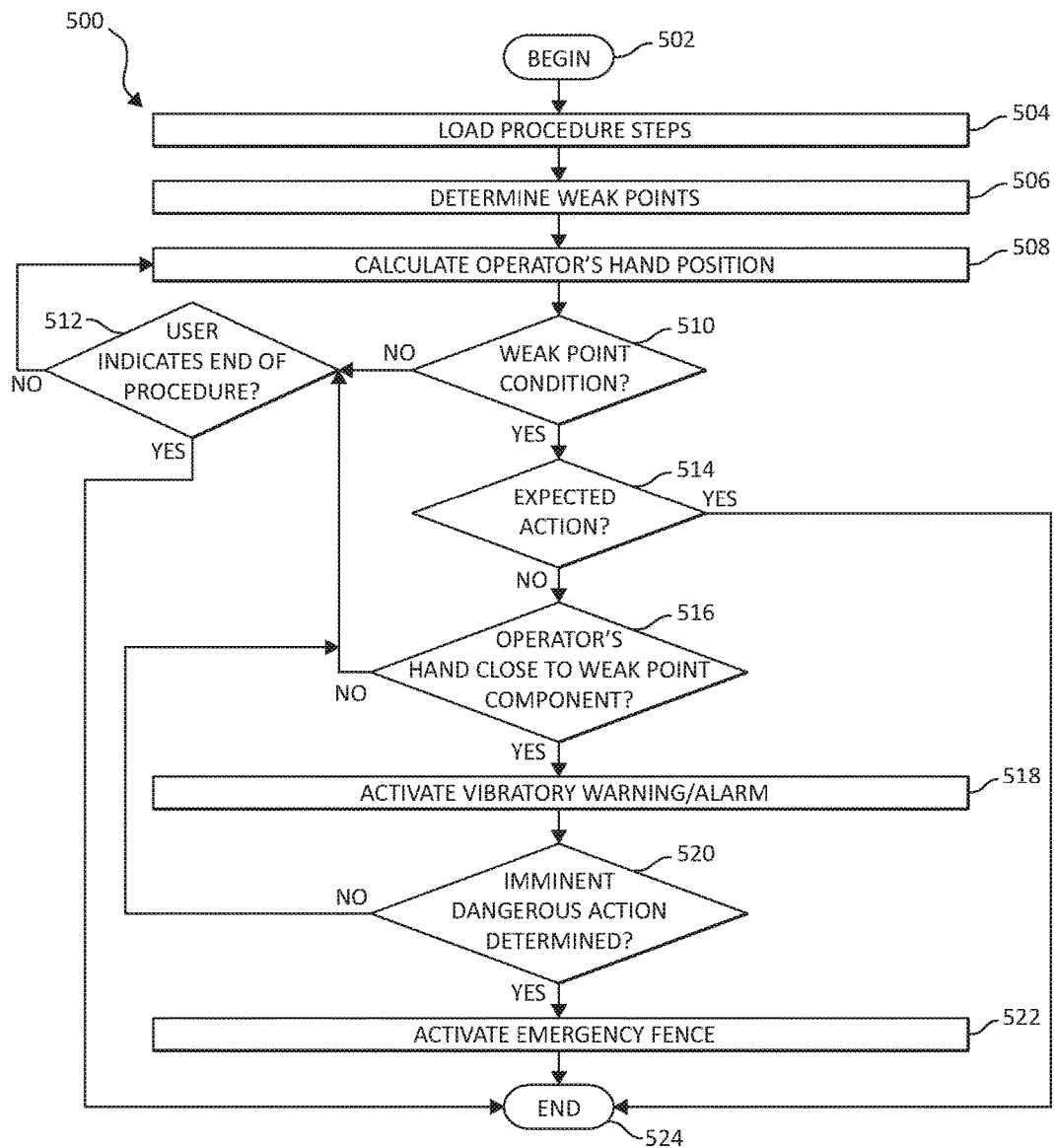
FIG. 5 is a flow chart diagram of an additional method for change management for monitored components in computing center environments, here again in which various aspects of the present invention may be implemented.

FIG. 5, following, illustrates an exemplary method 500 for preventative change management in which various aspects of the illustrated embodiments may be implemented. Method 500 begins (step 502) with the procedural start of the method 500 by the various sensory and computational components within the system.

In a subsequent step 504, certain procedural steps are loaded into the system. These steps may anticipate certain user gestures (e.g., saved procedures reflective of the physical motions that user may take to change a certain disk in a RAID array), or instructions for monitoring data throughput or current data in volatile memory, or other functional aspects of the mechanisms of the illustrated embodiments. The mechanisms of the illustrated embodiments In step 506, following, the various mechanisms of the illustrated embodiments undertake analysis functionality throughout the system to identify potential Achilles heel components (i.e., weak points in the system). As previously indicated, these potential Achilles heel components may include a wide variety of computing components, scenarios, subsystem components and scenarios, and the like.

As a user/technician/operator enters the computing center environment the various sensors calculate the operator's hand positions (step 508) and, in one embodiment, compare the monitored motions with that previously loaded into the system to determine if the operator is performing a predetermined gesture.

The method 500 moves to decision step 510, which queries whether the identified gestures or operator's hand position is in close proximity (for example) to a component/scenario that was previously identified as an Achilles heel (i.e., weak point) condition. If no, the method moves to decision step 512, which queries whether the user has reached the end of the monitored procedure. If yes, the method 500 ends (step 524).

Returning to step 512, if the user is determined not to have reached the end of the procedure, the method 500 returns to step 508, which continues to monitor the movements of the user (e.g., the user's hand position).

Returning to step 510, if a weak point condition was identified, the method 500 moves to decision step 514, which queries whether the monitored/recorded user's gestures were expected (correspond/conform to a predetermined action). If so, the method 500 then ends (again, step 524).

If the recorded user's gestures are determined not to be as expected, the method 500 moves to decision step 516, which queries whether the user's hand is in close proximity to an identified weak point component. If no, the method 500 moves to step 512 as previously.

If the user/operator's hand is determined to be in close proximity to a previously identified weak point component, the system then activates haptic feedback on the user's wearable device, such as vibrating the user's wristband as previously described, and also potentially indicating visually and/or audibly in the computing center environment (step 518).

The method 500 then moves from step 518 to decision step 520, which queries whether an imminent dangerous action is identified. These so-called "dangerous" actions may include actions previously indicated where an operator removes a wrong disk drive from a RAID array, or a battery that is powering an electrical component with no available backup battery currently in place. If the action is not determined to be imminently dangerous, the method 500 returns to decision step 512 as previously.

If the action in decision step 520 is determined to be imminently dangerous, the method 500 moves to step 522 to implement safeguard procedures as an "emergency fence," which may include a wide variety of electronic and/or data safeguarding measures known to one of ordinary skill in the art. Again, as previously described, these emergency fence procedures may include spinning down a RAID array, or partially shutting down a portion of the computing center environment before any potential damage occurs from the dangerous action. The method 500 then ends (again, step 524).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for implementing change control management in computing center environments by a processor, comprising:
    monitoring, by a hardware component configured to be worn by the user, a physical activity of a user performing an action associated with computing component repair or replacement in the computing center environment;
    using the hardware component to biometrically identify the user as authorized to perform the action in the computing center environment; and
    when the monitored activity is one of determined to be contrary and predicted to be contrary to a preferred, predetermined action for the computing center environment, performing each of:
        alerting the user that the action is contrary using the hardware component configured to be worn by the user, and
        performing an operation that secures data in the computing center environment from damage potentially caused by the contrary action; wherein the operation comprises putting at least a portion of the computing center environment into a recoverable downstate including initiating a data dump operation.

2. The method of claim 1, further including
    authorizing access to at least the portion of the computing center environment by use of a wearable login associated with the hardware component.

3. The method of claim 2, wherein the hardware component is a wristband, and wherein alerting the user that the action is contrary further includes at least one of:
    providing an auditory notification on at least one of in the computing center environment and through the wristband to the user, and
    vibrating the wristband to provide haptic feedback to the user of the alert.

4. The method of claim 1, further including performing at least one of:
    monitoring at least one of an input and output data throughput, and
    monitoring at least one of data currently held in at least one of a cache memory and random access memory (RAM) location in the computing center environment.

5. The method of claim 4, further including, when the action is determined to be contrary, performing at least one of:
    moving the currently held data to an additional memory location as the operation, and
    performing a shut down operation on at least a portion of the computing center environment.

6. The method of claim 1, further including performing at least one of:
    identifying an Achilles heel component within the computing center environment, and
    monitoring the user such that when the user takes an action on the Achilles heel component determined to be contrary, a predetermined action response is initiated to secure the Achilles heel component within the computing center environment.

7. The method of claim 1, wherein monitoring of the activity of the user performing the action further includes at least one of:

tracking a movement of the user within the computing center environment, and tracking a gesture made by the user pursuant to performing the action.

8. A system for implementing change control management in computing center environments, comprising:

a physical processor executing instructions stored in a memory device, wherein the processor, when executing the instructions:

monitors, by a hardware component configured to be worn by the user, a physical activity of a user performing an action associated with computing component repair or replacement in the computing center environment;

uses the hardware component to biometrically identify the user as authorized to perform the action in the computing center environment; and when the monitored activity is one of determined to be contrary and predicted to be contrary to a preferred, predetermined action for the computing center environment at a current or future time, performing each of:

alerts the user that the action is contrary using the hardware component configured to be worn by the user, and performs an operation that secures data in the computing center environment from damage potentially caused by the contrary action; wherein the operation comprises putting at least a portion of the computing center environment into a recoverable downstate including initiating a data dump operation.

9. The system of claim 8, further including a movable hardware component in communication with the processor; wherein the processor authorizes access to at least the portion of the computing center environment by use of a wearable login associated with the hardware component.

10. The system of claim 9, wherein the hardware component is a wristband, and wherein the processor, pursuant to alerting the user that the action is contrary, at least one of:

provides an auditory notification on at least one of in the computing center environment and through the wristband to the user, and vibrates the wristband to provide haptic feedback to the user of the alert.

11. The system of claim 8, wherein the processor at least one of:

monitors at least one of an input and output data throughput, and monitors at least one of data currently held in at least one of a cache memory and random access memory (RAM) location in the computing center environment.

12. The system of claim 11, wherein the processor, when the action is determined to be contrary, at least one of:

moves the currently held data to an additional memory location as the operation, and performs a shut down operation on at least a portion of the computing center environment.

13. The system of claim 8, wherein the processor at least one of:

identifies an Achilles heel component within the computing center environment, and monitors the user such that when the user takes an action on the Achilles heel component determined to be contrary, a predetermined action response is initiated to secure the Achilles heel component within the computing center environment.

14. The system of claim 8, wherein the processor, pursuant to monitoring of the activity of the user performing the action, at least one of:

tracks a movement of the user within the computing center environment, and tracks a gesture made by the user pursuant to performing the action.

15. A computer program product for implementing change control management in computing center environments by a processor, the computer program product comprising a non-transitory computer-readable storage medium having computer-readable program code portions stored therein, the computer-readable program code portions comprising:

an executable portion that monitors, by a hardware component configured to be worn by the user, a physical activity of a user performing an action associated with computing component repair or replacement in the computing center environment;

an executable portion that uses the hardware component to biometrically identify the user as authorized to perform the action in the computing center environment; and an executable portion that, when the monitored activity is one of determined to be contrary and predicted to be contrary to a preferred, predetermined action for the computing center environment, performing each of:

alerts the user that the action is contrary using the hardware component configured to be worn by the user, and performs an operation that secures data in the computing center environment from damage potentially caused by the contrary action; wherein the operation comprises putting at least a portion of the computing center environment into a recoverable downstate including initiating a data dump operation.

16. The computer program product of claim 15, further including an executable portion that authorizes access to at least the portion of the computing center environment by use of a wearable login associated with the hardware component.

17. The computer program product of claim 16, wherein the hardware component is a wristband, and further including an executable portion that, pursuant to alerting the user that the action is contrary, at least one of:

provides an auditory notification on at least one of in the computing center environment and through the wristband to the user, and vibrates the wristband to provide haptic feedback to the user of the alert.

18. The computer program product of claim 15, further including an executable portion that at least one of:

monitors at least one of an input and output data throughput, and monitors at least one of data currently held in at least one of a cache memory and random access memory (RAM) location in the computing center environment.

19. The computer program product of claim 18, further including an executable portion that, when the action is determined to be contrary, at least one of:

moves the currently held data to an additional memory location as the operation, and performs a shut down operation on at least a portion of the computing center environment.

20. The computer program product of claim 15, further including an executable portion that at least one of:
   identifies an Achilles heel component within the computing center environment, and
   monitors the user such that when the user takes an action on the Achilles heel component determined to be contrary, a predetermined action response is initiated to secure the Achilles heel component within the computing center environment.

21. The computer program product of claim 15, further including an executable portion that, pursuant to monitoring of the activity of the user performing the action, at least one of:
   tracks a movement of the user within the computing center environment, and
   tracks a gesture made by the user pursuant to performing the action.

* * * * *